United States Patent
Yamada et al.

[11] Patent Number: 5,828,507
[45] Date of Patent: Oct. 27, 1998

[54] METHOD FOR RECORDING DATA ONTO TAPE-SHAPED RECORDING MEDIA FOR HIGH-SPEED RETRIEVAL BASED ON SYSTEM LOG INFORMATION RECORDED IN A LEADING PARTITION

[75] Inventors: Masaki Yamada; Shinya Ozaki, both of Kanagawa, Japan

[73] Assignee: Sony Corporation, Tokyo, Japan

[21] Appl. No.: 507,670

[22] Filed: Jul. 25, 1995

[30] Foreign Application Priority Data

Jul. 27, 1994 [JP] Japan .................................... 6-175530

[51] Int. Cl.⁶ ........................................................ G11B 5/09
[52] U.S. Cl. ................................................ 360/48; 360/53
[58] Field of Search .................................. 360/48, 77.13, 360/72.2, 53, 49, 71; 395/438, 183.21; 371/225

[56] References Cited

U.S. PATENT DOCUMENTS

| 5,081,548 | 1/1992 | Inazawa et al. | 360/72.2 |
| 5,287,478 | 2/1994 | Johnston et al. | 360/48 X |
| 5,379,152 | 1/1995 | Odaka et al. | 360/53 X |
| 5,406,425 | 4/1995 | Johnston et al. | 360/48 |
| 5,559,644 | 9/1996 | Ozaki et al. | 360/48 |

*Primary Examiner*—Aristotelis M. Psitos
*Assistant Examiner*—Patrick Wamsley
*Attorney, Agent, or Firm*—Jay H. Maioli

[57] ABSTRACT

A data recording method is provided in which the time required for recording/reproduction of system logs for each partition is shortened for a tape format having plural partitions. In recording data on an azimuth track on a magnetic tape having a tape format having plural partitions, using a rotary head, the system logs of each partition are recorded in a system region of a leading side partition P1.

4 Claims, 10 Drawing Sheets

| LEADER TAPE | DEVICE AREA | REFERENCE AREA | SYSTEM AREA | DATA AREA | EOD AREA | |
|---|---|---|---|---|---|---|

PBOT ｜ LBOT ｜ ... ｜ LEOT PEOT

METHOD FOR RECORDING DATA ONTO TAPE-SHAPED RECORDING MEDIA FOR HIGH-SPEED RETRIEVAL BASED ON SYSTEM LOG INFORMATION RECORDED IN A LEADING PARTITION

BACKGROUND OF THE INVENTION

This invention relates to a method and apparatus for recording data transmitted from, e.g., a computer on an azimuth track of a magnetic tape by a rotary head.

In a computer, it is frequently practiced to transfer data recorded of e.g., a hard disc to a data recorder termed a data streamer, e.g., once every day for protecting the data.

Up to now, a conventional analog audio tape recorder has preferentially been used as the above data recorder. However, with the analog audio tape recorder, the amount of consumption of the magnetic tape is increased excessively, while data recording and transfer become time-consuming because of the low data recording rate. In addition, since high-speed retrieval is not feasible with the analog audio tape recorder, searching or locating of a data start portion is also time-consuming.

Thus it has been practiced to use a helical-scan digital audio tape recorder employing a rotary head, or a so-called DAT, as the data recorder.

Figure 1:
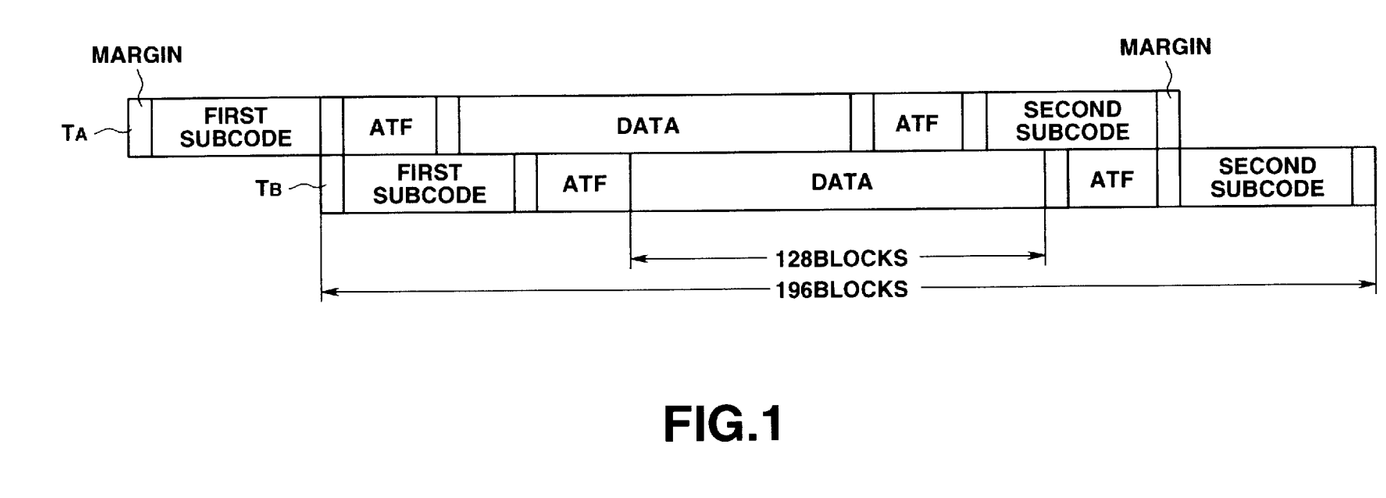
FIG. 1 shows a DAT format.

When employing the DAT as the tape recorder, data from a host computer are converted into data of a DAT format before being recorded. With the DAT format, each frame is constituted by two azimuth tracks $T_A$, $T_B$ formed during one complete revolution of two heads with different azimuth angles, and 16-bit PCM audio data are recorded by an interleaving technique with one frame as a recording unit, as shown in FIG. 1. Each track is made up of 196 blocks, each block consisting of 36 bytes. Of these blocks, both terminal 34 blocks are sub-areas, with the mid 128 blocks being a main area.

Each sub-area is divided, beginning from one track end, into a margin portion, a preamble portion for sub-code PLL, a first subcode portion, a postamble portion, a gap portion between adjacent blocks, automatic track finding (tracking) signal portion or ATF portion, a gap portion between adjacent blocks, a preamble portion for data PLL, a preamble portion for adjacent blocks, an ATF signal portion, a gap portion between adjacent blocks, a preamble portion for subcode PLL, a second subcode portion, a postamble portion, a gap portion between adjacent blocks and a margin portion. Each of the first and second subcode blocks is made up of 8 blocks, with the remaining portions being made up of respective pre-set number of blocks.

Figure 2:
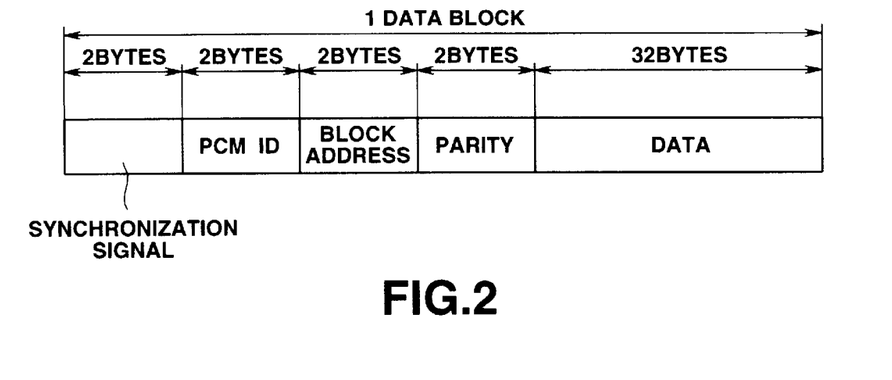
FIG. 2 shows a block format for main data in the DAT format.

The main area is made up of 128 blocks. Each data block has one byte each of the synchronization signal, PCM-ID, block address and the parity, beginning from its leading end. Main data is arrayed in the next following 32 bytes, as shown in FIG. 2.

Figure 3:
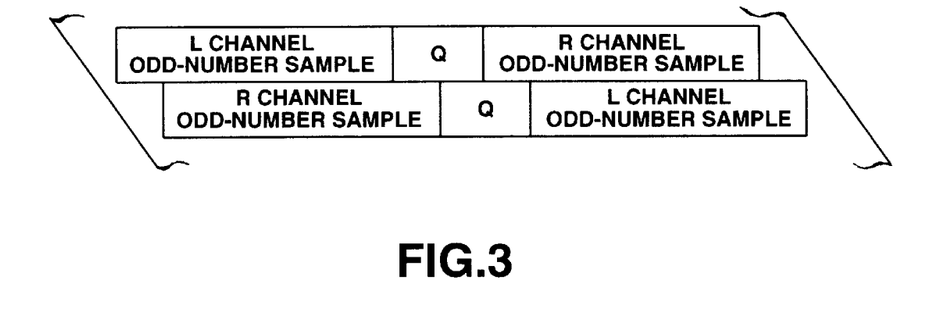
FIG. 3 shows data array in the DAT format in which the interleaving technique is applied.

If the data is audio signals, the main data is 16-bit PCM data for the left channel and 16-bit PCM data for the right channel. The 16-bit main data are interleaved in the main areas of two tracks constituting a frame and arrayed along with parity Q data, as shown in FIG. 3. In this case, about 5760 bytes of data are recorded in the main area of one frame.

By dividing a track into the main area and the sub-area, post-recording may be made with the DAT format, using the sub-area.

Figure 4:
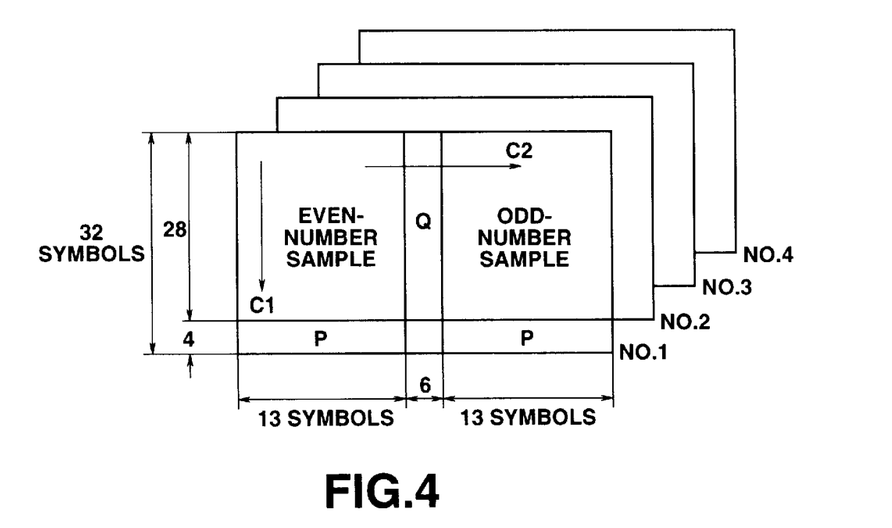
FIG. 4 shows the construction of the error correction coding of main data in the DAT format.

The construction of the error correction code for main data in the DAT format is the product code as shown in FIG. 4, with the code plane being made up of four sub-planes per track. Each sub-plane is coded in C1 and C2 directions.

If the data recorder is employed as a data recorder, data transmitted from a host computer is converted to 16-bit data which is treated in the same way as the PCM data and formatted for recording in a one-frame main area. In this case, 2-byte 16-bit data for the L and R channels are used, of which upper four bits, for example, are recorded as format ID and the remaining eight bits are recorded as a logical frame number. The format ID indicates the format proper to the data recorder. Logical frame numbers of 1 to 23 are affixed to each of 23 frames as a unit.

As a format of a data recorder employing such DAT, the formats DDS and DDS2, for example, are prescribed under the standard of the European Computer Manufacturers Association (ECMA).

With the DDS or DDS2 format, a device region from a physical tape beginning position or physical beginning of tape (PBOT) up to a logical tape beginning position or logical beginning of tape (LBOT) is prescribed in a leading area consecutive to the leader tape as being a region for effecting tape loading and unloading. The device region is followed by a reference region and a system region. The reference region is used as a physical reference for recording a system log in the system region. A data region for data recording is recorded next to the system region, and an end-of-data (EOD) region is recorded next to the data region.

The DDS2 format also provides a two-partition tape having two partitions P1 and P2 each having a reference region, a system region, a data region and an EOD region. The system log is recorded in the system region of each of the partitions P1 and P2. The system log is recorded by multiplex recording in a sub-code region of the system area in the form of a pack.

With the above-described DDS or DDS2 format, the system log for each partition is individually recorded in each system region of each of the partitions. Thus it becomes necessary to access the system regions when loading/unloading the tape, thereby consuming a lot of time for loading/unloading.

Since the system region is recorded or reproduced a number of times, tape damage becomes excessive thus necessitating multiplex recording. Since the error correction coding is not provided for the sub-code region, the sub-code region is lower in reliability than the main data.

As for the firmware, accessing of data recorded by multiplex recording for improving reliability consumes a lot of time. In effect, checking can be made only up to the frame time limit. In addition, the sorts of items that can be written are limited, if in the form of the pack.

SUMMARY OF THE INVENTION

It is therefore an object of the present invention to provide a data recording method for recording data in an azimuth track on a magnetic tape by a rotary head in accordance with a tape format having plural partitions each of which has at least a system region and a data region, in which the time required for recording/reproducing the system log for each partition may be reduced.

It is another object of the present invention to provide a data recording method for recording data in an azimuth track on a magnetic tape by a rotary head in accordance with plural tape formats each having plural partitions each of which has at least a system region and a data region, in which the system logs are stored in a manner adapted to the respective tape formats.

It is still another object of the present invention to provide a data recording method in which the system logs may be improved in reliability.

In one aspect, the present invention provides a method for recording data in an azimuth track on a magnetic tape by a rotary head in accordance with a tape format having plural partitions, which method consists in recording the tape system log information for each partition in a system region of a leading side partition.

In another aspect, the present invention provides a method for recording data in an azimuth track on a magnetic tape by a rotary head in accordance with a tape format having plural partitions each of which has at least a system region and a data region, which method consists in recording the tape system log information for each partition in a system region of a leading side partition.

In a further aspect, the present invention provides a data recording method consisting in splitting each track into a main data region and margin regions on both sides of the main data region, splitting the main data region of each track into plural blocks, splitting each block into plural portions, recording synchronization signals in the first portion of each block, recording the subcode in the second portion, recording main data in the third portion, and recording the tape system log information for each partition in the system region of a leading side partition as the subcode.

In a further aspect, the present invention provides a data recording method consisting in splitting each track into a main data region and merging regions on both sides of the main data region, splitting the main data region of each track into plural blocks, splitting each block into plural portions, recording synchronization signals in the first portion of each block, recording the subcode in the second portion, recording main data in the third portion, and recording the tape system log information for each partition in the system region of a leading side partition as the main data.

In a further aspect, the present invention provides a method for recording data in an azimuth track on a magnetic tape by a rotary head in accordance with a plurality of tape formats each having plural partitions, which method consists in discriminating the tape formats of the magnetic tape, recording the tape system log information of each partition of the magnetic tape of a first tape format in a system region of each partition, and recording the tape system log information for each partition in the system region of the leading side partition of the magnetic tape of the second tape format.

In a further aspect, the present invention provides a method for recording data in an azimuth track on a magnetic tape by a rotary head in accordance with a plurality of tape formats each having plural partitions each having at least a system region and a data region, which method consists in discriminating the tape format of a magnetic tape, recording the tape system log information for each partition of a magnetic tape of a first tape format in the system region of each partition, and recording the tape system log information for each partition of a magnetic tape having the second tape format on the system region of the leading side partition.

In a further aspect, the present invention provides a data recording method for the magnetic tape of the second tape format which method consists in splitting a track of each magnetic tape of the second tape format into a main data region and margin regions on both sides of the main data region, splitting the main data region of each track into a plurality of blocks, recording a synchronization signal, a subcode and main data in first, second and third portions of each block, respectively, and recording the tape system log information for each partition in a system regions of the partition as the subcode.

In yet another aspect, the present invention provides a data recording method for a magnetic tape of the second tape format which method consists in splitting each track into a main data region and margin regions on both sides of the main data region, splitting the main data region of each track into a plurality of blocks, splitting each block into plural portions, recording a synchronization signal, a subcode and main data in first, second and third portions of each block, and recording the tape system log information for each partition in a system regions of the partition as the main data.

With the data recording method of the present invention, when recording data on an azimuth track on a magnetic tape by a rotary head in accordance with a tape format having plural partitions, the system log information for each partition is recorded in the system region of the leading side partition, thereby reducing the time required for recording/reproducing the system log for each partition.

The tape system log information for each partition is recorded as a subcode in the system region of the leading side partition as the subcode, or the tape system log information for each partition is recorded as a main data in the system region of the leading side partition as the main data.

Also the tape format of the magnetic tape is discriminated so that, for the magnetic tape of the first tape format, the tape system log information for each partition is recorded in the system region of each partition, while, for the magnetic tape of the second tape format, the tape system log information is recorded in the system region of the leading side partition, thereby enabling recording of system logs adapted to respective tape formats. The tape system log information for each partition is recorded in the system region of the partition as the subcode.

Alternatively, the tape system log information of each partition is recorded in the system region of the partition as main data, thereby improving system log reliability.

DETAILED DESCRIPTION OF THE PREFERRED EMBODIMENTS

Referring to the drawings, certain preferred embodiments of the data recording method of the present invention will be explained in detail.

Figure 5:
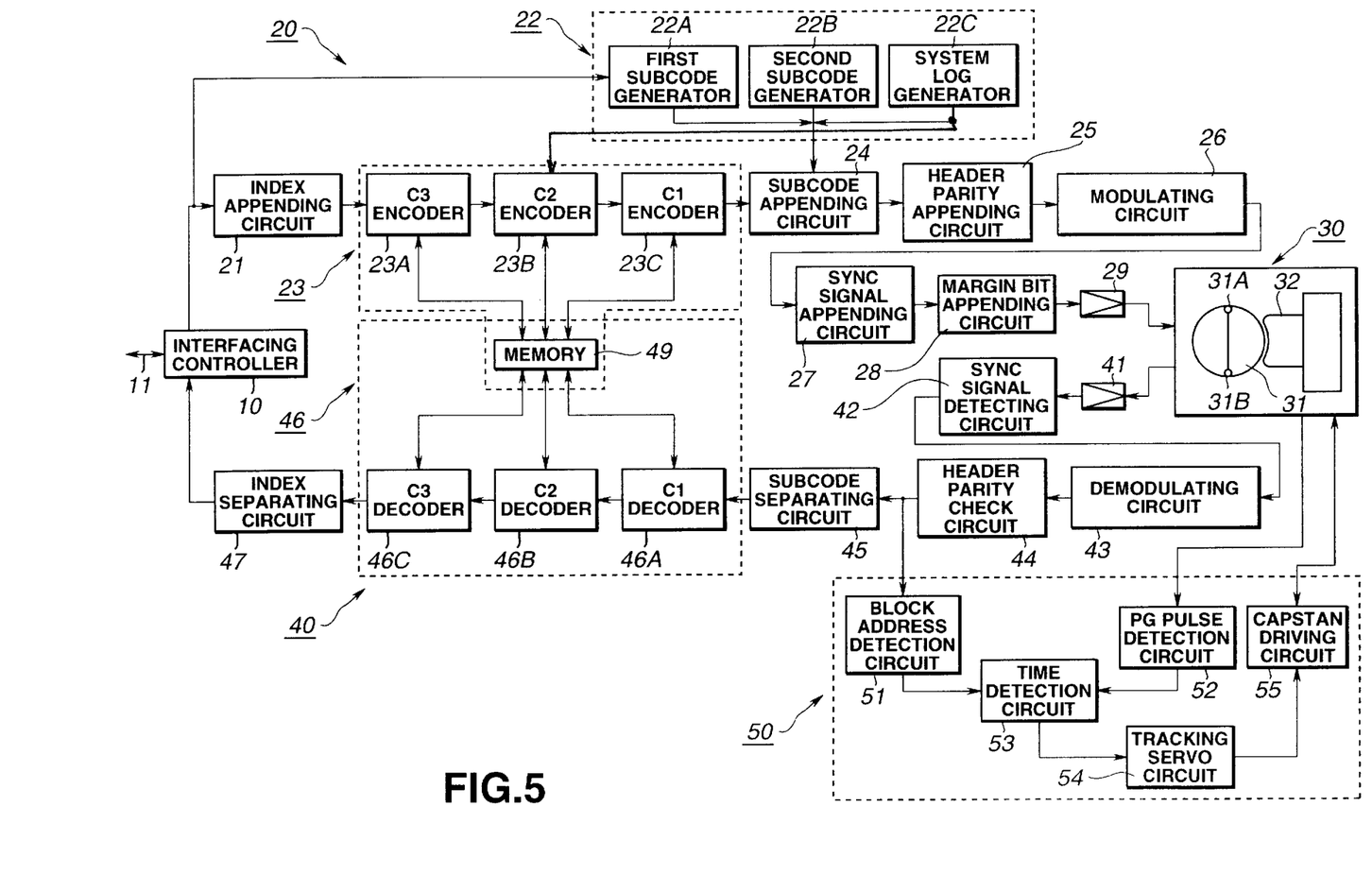
FIG. 5 is a block circuit diagram showing the construction of a data streamer for carrying out the data recording method according to the present invention.

The data recording method of the present invention is carried out by a data streamer as shown for example in FIG. 5.

The data streamer causes data to be recorded on and reproduced from an azimuth track on a magnetic tape by a rotary magnetic head and includes an interfacing controller 10 for data exchange with outside and a recording system signal processing section 20 for processing input data supplied to the data streamer via the interfacing controller 10 for conversion into signals of a pre-set format. The data streamer also includes a recording/reproducing section 30, a reproducing system signal processing section 40 and a tracking control section 50. The recording/reproducing section 30 records a signal supplied from the recording system signal processing section 20 by a pair of rotary magnetic heads 31A, 31B on azimuth tracks on a pair of rotary magnetic heads 31A, 31B and reproduces the signals recorded on the azimuth tracks by the rotary magnetic heads 31A, 31B. The reproducing system signal processing section 40 processes the playback signal from the recording/reproducing section 30 to reproduce the original data, while the tracking control section 50 controls the tape running system of the recording/reproducing section 30.

Figure 6:
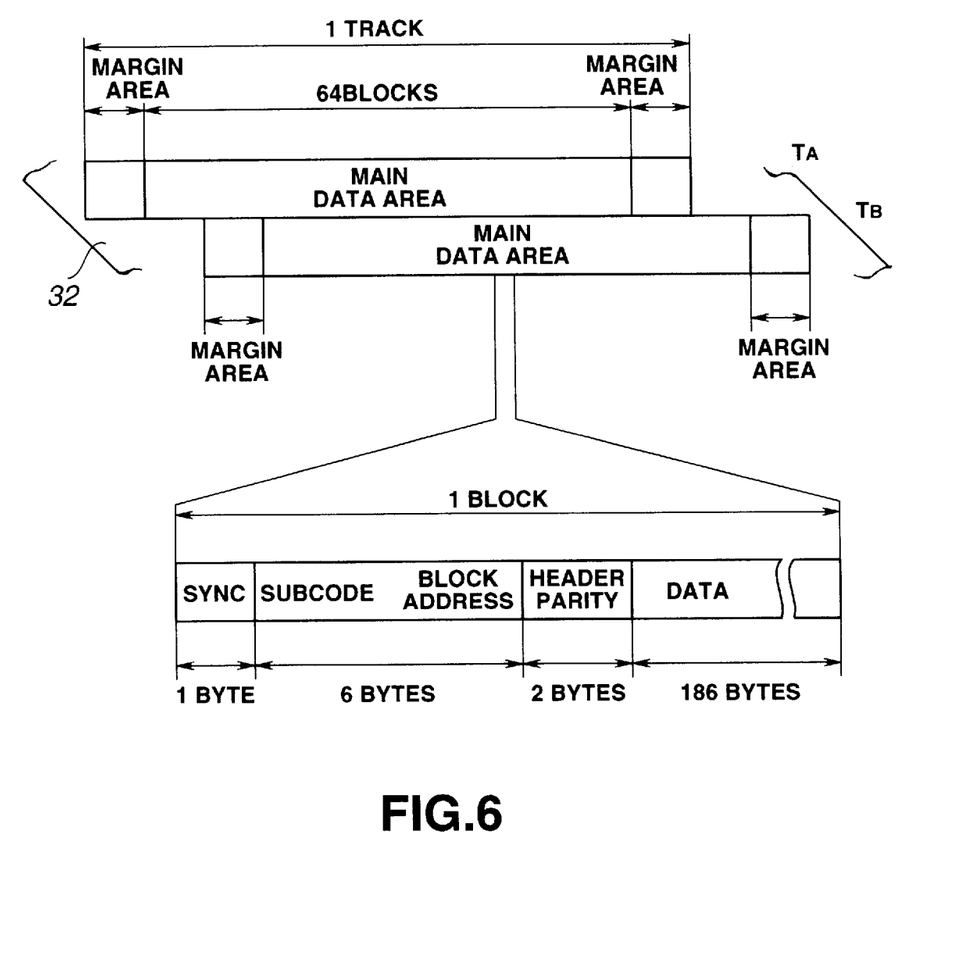
FIG. 6 shows the track format of a magnetic tape for data recording by the data streamer.

In the present data streamer, the recording/reproducing section 30 has a rotary drum 31 made up of a pair of rotary magnetic heads 31A, 31B arranged at an angle of 180° relative to each other. On the peripheral surface of the rotary drum 31 is placed the magnetic tape 32 over an angle substantially equal to 90° and is run at a pre-set running velocity. During each complete revolution of the rotary drum 31, two azimuth tracks $T_A$, $T_B$ on the magnetic tape 32 are scanned by the rotary magnetic heads 31A, 31B for recording/reproducing the signals, as shown in FIG. 6.

The data streamer splits one track into three regions, namely a main data region and two margin regions on both ends of the data region. The data streamer also splits the main region into 64 blocks, each bock being made up of 195 bytes. The data streamer divides each block into four portions, namely a one-byte first portion for recording a synchronization signal, a six-byte second portion for recording the sub-code and a block address, a 2-byte third portion for recording the header parity and a 186-byte fourth portion for recording data. In each block of the main data region, the sub-code and the block address are recorded along with data.

Figure 7:
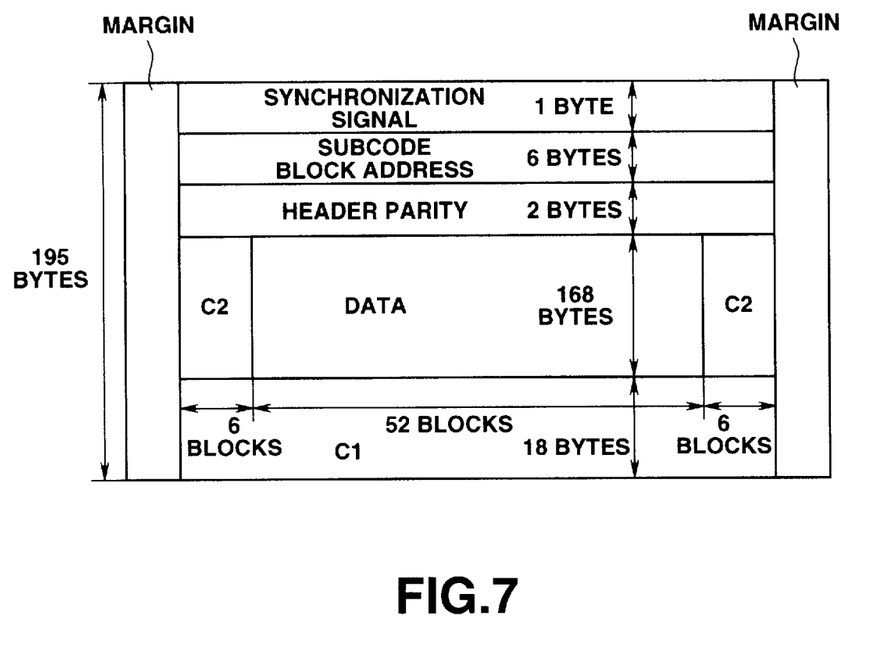
FIG. 7 shows a data construction for one track of data recorded on a magnetic tape by the data streamer.

To the 186-byte data recorded in the fourth portion are appended correction codes (product codes) C2, C1, as shown in FIG. 7. The correction code C1 is appended to and recorded with the block-based main data, while the error correction code C2 is divided into two portions which are recorded in both end portions of the main data region of each track.

Figure 8:
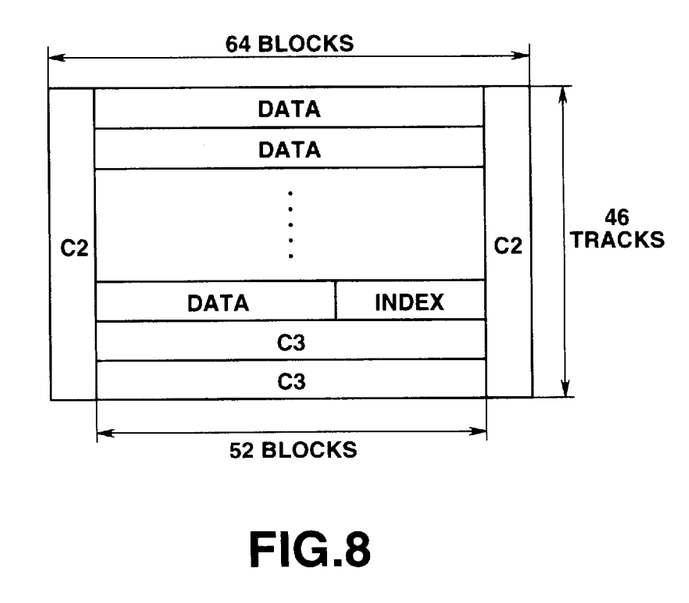
FIG. 8 shows a data construction for one unit of 46 tracks of data recorded on a magnetic tape by the data streamer.

The data streamer employs a code construction for error correction in which two tracks or 128 blocks make up one frame and 46 tracks or 23 frames make up one unit or group. The error correction code C2 for data strings along the track direction is arrayed and recorded on both ends of the tracks and the error correction code C3 for the data string along the track width is allocated for the last two of the 46 tracks, as shown in FIG. 8. The index information for partitioning a series of data is appended at a one-unit interval.

As the sub-code, a separator count, which is the information concerning the partitioning of the main data, a record count indicating the number of records, an area ID indicating each region defined on the tape format, frame numbers indicating the absolute positions of the recording units, the group counts indicating the number of recording units, and the check sum, are recorded.

Figure 9:
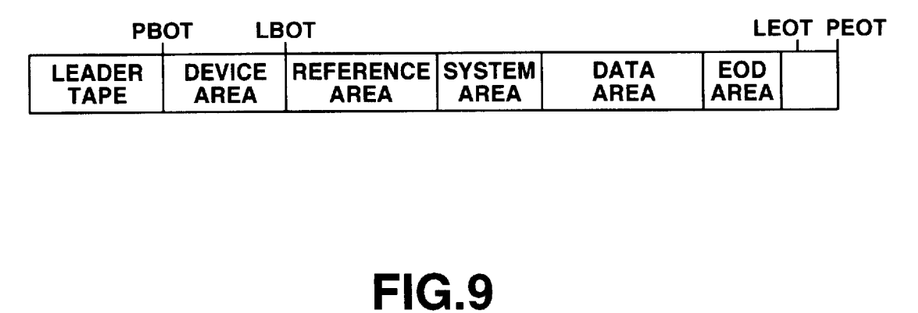
FIG. 9 shows a tape format of a magnetic tape for recording the data by the data streamer.
Figure 10:
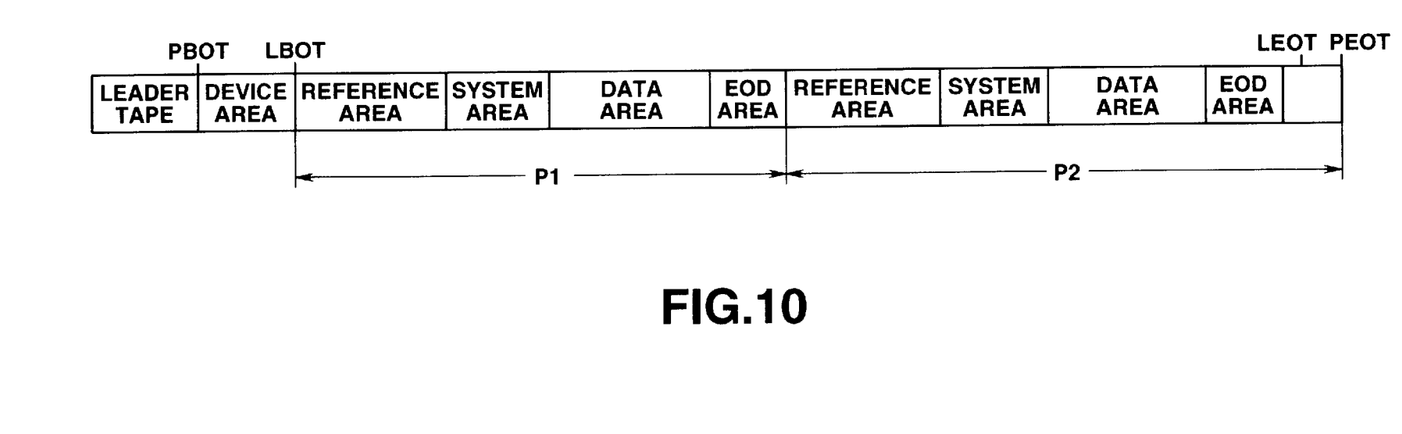
FIG. 10 shows a data format of a 2-partition magnetic tape.

In the present data streamer, similarly to the DDS2 format, there is defined, as a region for effecting loading and unloading of the magnetic tape, a device region in a leading region in direct succession to the leader tape. The device region is a region from a physical tape beginning position or physical beginning of tape (PBOT) up to a logical tape beginning position or logical beginning of tape (LBOT), as shown in FIG. 9. The device region is followed by a reference region and a system region. The reference region is used as a physical reference for recording the system log in the system region. A data region for recording the data is provided next to the system region, and an end-of-data (EOD) region is recorded next to the data region. The present data streamer provides a two-partition tape having two partitions P1 and P2 each having a reference region, a system region, a data region and an EOD region, as shown in FIG. 10.

The system logs of the partitions P1 and P2 are recorded in the system region of the partition P1. By recording the system logs in the system region of the partition P1, it suffices to record/reproduce only the system region of the partition P1, thereby allowing to reduce the time required in recording/reproducing the system logs of the respective partitions.

In the present data streamer, the interfacing controller 10 exchanges data over a bus 11 with an external host computer, not shown, while transmitting data supplied from the host computer to the recording system signal processing section 20 and also transmitting data reproduced by the reproducing system signal processing section 40 to the host computer.

The recording system signal processing section 20 has an index appending unit 21 and a subcode generator 22 fed with data entering the interfacing controller 10, and an error code generator 23 fed with main data to which the index information has been appended by the index appending circuit 21. The processing section also includes a sub-code appending circuit 24 fed with the main data from the error correction code generator 23, having the error correction code appended thereto by the error correction code generating circuit 23, and with the subcode and the block address from the subcode generating circuit 22. The processing section also includes a header parity appending circuit 25 fed with main data to which the subcode and the block address have been appended by the subcode appending circuit 24. The processing section 20 also includes a modulating circuit fed with main data to which the header parity has been appended by the header parity appending circuit 25, and a synchronization signal appending circuit 27 fed with main data converted into 10-bit data by the modulating circuit 26. The processing section 20 also includes a merging bit appending circuit 28 fed with main data to which the synchronization signal has been appended by the synchronization signal appending circuit 27, and a recording amplifier 29 fed with the main data to which the merging data has been appended by the merging bit appending circuit 28.

The index appending circuit 21 appends the index information to input data supplied thereto via the interfacing controller 10. The index information is used for splitting the input data in terms of units each consisting of the above-mentioned 46 tracks or 23 frames.

The error correction code generator 23 includes a memory 49, a C3 encoder 23A, a C2 encoder 23B and a C1 encoder 23C.

In the error code generator 23, the memory 49 temporarily stores main data, to which the index information has been appended by the index information appending circuit 21, in terms of units. The C3 encoder 23A generates, for the unit-based main data stored in the memory 49, an error correction code C3 for data strings along the track width, and allocates the error correction code C3 to the last two of the one-unit 46 tracks. The C2 encoder 23B also generates an error correction code C2 for data strings along the track direction, splits the error correction code C2 in two portions and allocates the portions to both end portions of the main data region. In addition, the C1 encoder 23C generates the error correction code C1 on the block basis.

The subcode appending circuit 24 appends the block address and the subcode supplied from the subcode generator 22 to the main data to which the error correction codes C3, C2 and C1 have been appended by the error correction code generator 23. The subcode and the block address are allocated in this manner to the second portion of each block.

The subcode generator 22 includes first and second subcode generating circuits 22A and 22B and a system log generating circuit 22C.

The first subcode generating circuit 22A of the subcode generator 22 generates e.g., record counts indicating the number of records or separator counts as the main data partitioning information based upon data supplied thereto via the interfacing controller 10. The second subcode generating circuit 22B automatically generates area IDs indicating respective regions defined on a tape format, frame numbers, group counts indicating the number of recording units or the check sum, along with the block addresses. The system log generating circuit 22C also generates the system log for each of the partitions P1 and P2 prescribed as the tape formats.

The header parity appending circuit 25 generates 2-byte parity for error detection for the block address and the subcode appended to the main data by the subcode appending circuit 24 and appends the 2-byte parity to the main data. The 2-byte parity is allocated in this manner to the third portion of each block.

The modulating circuit 26 converts the main data, to which the header parity and the block address have been appended by the header parity appending circuit 25, from 8-bit data to 10-bit data, on the byte basis, so that the dc level of the recording signals will be maintained at a substantially zero level.

The synchronization signal appending circuit 27 appends the synchronization signal, on the block basis, to the main data converted by the modulating circuit 26 into the 10-bit data. The synchronization signal is allocated in this manner to the first portion of each block.

The margin bit appending circuit 28 appends margin bits to main data, to which the synchronization signal has been appended by the synchronization signal appending circuit 27, on the track basis. The margin region is annexed in this manner to both sides of each main data region on the track basis.

The main data, to which the margin bits have been appended on the track basis by the margin bit appending circuit 28, are supplied via the recording amplifier 29 to the recording/reproducing section 30.

The data streamer, having the above-described recording system signal processing section 20, splits one track into three regions, namely a main data region and two margin regions on both ends of the data region. The data streamer also splits the main region into 64 blocks, each block being made up of 195 bytes. The data streamer divides each block into four portions, namely a one-byte first portion for recording a synchronization signal, a six-byte second portion for recording the sub-code and a block address, a 2-byte third portion for recording the header parity and a fourth portion for recording the data. In each block of the main data region, the sub-code and the block address are recorded along with the data. As the sub-code, a separator count, which is the information concerning the partitioning of the main data, a record count indicating the number of records, an area ID indicating each region defined on the tape format, frame numbers, the group counts indicating the number of recording units, and the check sum, may be recorded. The track utilization efficiency may be increased by splitting each track into a main data region and margin regions on both sides of the main data region and recording the subcode along with the main data in the main data region. In addition, by recording the two-byte parity for subcode error correction in the third portion of each block, subcode reliability and hence the track utilization efficiency of a data recording medium may be improved.

It is also possible with the present data streamer to generate the error correction codes (product codes) C2 and C1 for 186-byte data to be recorded in the fourth portion, append the error correction code C1 to the block-based main data for recording, and to split the error correction code C1 in two portions for recording in two terminal portions of the main data region. The block-based main data reliability may be improved by recording the error correction code C1 in this manner for each block, while the track-based main data reliability may be improved by recording the error correction code C2 for each block. In addition, by splitting the error correction code C2 and recording these portions on both end portions of the main data region for each track, the main data region may be separated from the slide contact start/ end portion with respect to the rotary head to reduce the error otherwise produced in the data of the main data region.

It is also possible with the present data streamer to exploit an error correcting code construction in which 46 tracks, that is 23 frames, are grouped in one unit, each frame being two tracks or 128 blocks, record the error correction code C2 for data strings along the track direction on both sides of each track and to allocate the error correction code C3 for the data strings along the track width in the last two of the 46 tracks. In addition, the index information for partitioning a series of data may be appended for each unit for recording. By recording the error correction code C2 for data strings along the track direction on both sides of each track, the main data may be rendered less susceptible to destruction for lowering the probability of error occurrence in the main data, so that it becomes possible to positively correct errors in the main data by the error correction code C3 for the data strings along the track width.

In addition, with the present data streamer, both the system logs of the partitions P1 and P2 are recorded as the subcode in the system region of the partition P1. By recording both the system logs of the partitions P1 and P2 in the system region of the partition P1, the access time may be shortened and a data streamer showing good operability may be achieved.

The reproducing system signal processing section 40 in the present data streamer includes a synchronization signal detection circuit 42, fed with the playback signal reproduced from the azimuth track of the magnetic tape 32 by the recording/reproducing section 30 via a playback amplifier 41, and a demodulating circuit 43 fed with bi-level playback data from the synchronization signal detection circuit 42. The processing section 41 also includes a subcode separating circuit 45 fed with the playback data, converted into 8-bit data from the 10/8 demodulating circuit 43, via a header parity check circuit 44, an error correction unit 46 fed with the playback data freed of the subcode by the subcode separating circuit 45 and an index separating circuit 47 fed with playback data error-corrected by the error correcting circuit 46.

The synchronization signal detection circuit 42 of the reproducing system processing section 40 detects the synchronization signal in the playback signal supplied from the recording/reproducing section 30 via the playback amplifier 41 and converts the playback signal into a bi-level signal by clocks synchronized with the synchronization signal for generating playback data.

The demodulating circuit 43 converts the playback data supplied from the synchronization signal detection circuit 42 from the 10-bit data to the 8-bit data. Thus the demodulating circuit effects 10/8 conversion which is a counterpart operation of the 8/10 conversion by the modulating circuit 26.

The parity check circuit 44 effects parity check of the subcode and the block address using the above-mentioned 2-byte header parity. In the subcode separating circuit 45, the correct subcode, parity-checked by the parity check circuit 44, is separated from the playback data, so as to be transmitted to, e.g., a system controller, not shown.

The error correction unit 46 includes the above-mentioned memory 49, a C1 decoder 46A, a C2 decoder 46B and a C3 decoder 46C.

The memory 49 of the error correction unit 46 temporarily stores the main data, to which the index information has been appended, with 46-track or 23-frame main data portions as a unit of storage. The memory 49 is co-used by the error correction unit 23 of the recording system signal processing section 20.

The C1 decoder 46A effects data correction on each block of the main data, stored unit-by-unit in the memory 49, using the error correction code C1 appended on the block basis. On the other hand, the C2 decoder 46B effects data correction on each data string along the track direction of the unit-based main data, which has been error-corrected by the C1 decoder 46A, using the error correction code C2 appended to both end portions of the main data region for each track. In addition, the C3 decoder 46C effects data correction on each data string along the track width of the unit-based main data, which has been error-corrected by the C2 decoder 46B, using the error correction code C3 allocated to the last two of the one-unit 46 tracks.

The index separating circuit 47 separates the index information from the unit-based main data, which has been error-corrected by the error correcting unit 46, and routes the separated index information to e.g., a system controller, not shown.

In the present data streamer, having the above-described reproducing system signal processing section 40, error correction of the main data may be achieved positively to give highly reliable main data by effecting error correction by the error correction unit 46 using the block-based error correction code C1, track-based error correction code C2 and the unit-based error correction code C3.

In the present data streamer, the tracking control section 50 includes a block address detection circuit 51 fed with the block address via the header parity check circuit 44 from the reproducing system signal processing section 40, and a PG detection circuit 52 fed with the PG pulse from the block address detection circuit 51. The tracking control section 50 also includes a time detection circuit 53 fed with detection outputs of the block address detection circuit 51 and the PG detection circuit 52, a tracking servo circuit 54 fed with a detection output of the time detection circuit 53 and a capstan driving circuit 55 fed with an output of the tracking servo circuit 54.

Figure 11:
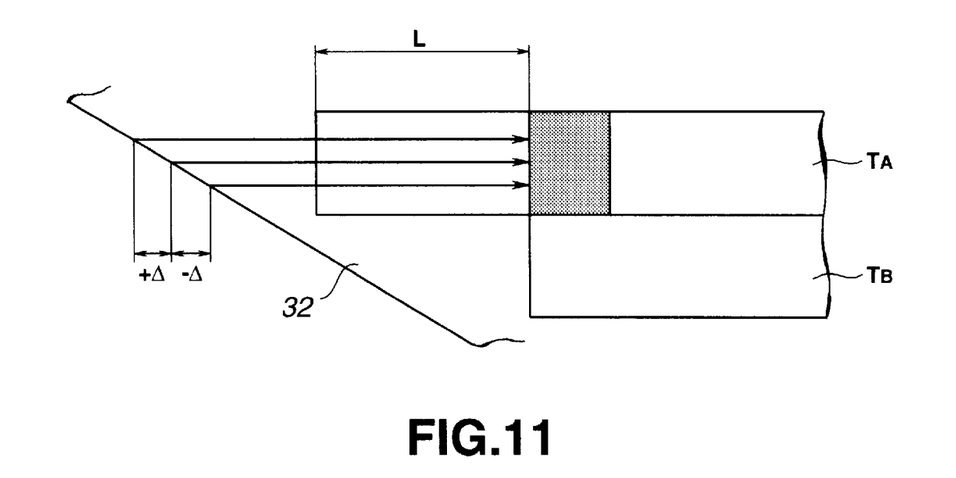
FIG. 11 illustrates the tracking error detection principle by a tracking controller in the data streamer.

In the tracking control section 50, the block address detection circuit 51 detects the correct block address, parity-checked by the header parity check circuit 44, and routes a detection output indicating the detection timing to the time detection circuit 53. The PG detection circuit 52 detects the PG pulse indicating the rotational phase of the rotary drum 31 supplied from the recording/reproducing section 30 and routes a detection output indicating the detection timing to the time detection circuit 53. The time detection circuit 53 detects the time which elapses since the timing of detection of the pre-set block address by the block address detection circuit 51 until the timing of detection of the PG pulse by the PG detection circuit 52. Supposing that an azimuth track on the magnetic tape 32 is scanned by the rotary magnetic heads 31A, 31B having a pre-set rotational phase, the scanning distance from the tape edge of a track to a pre-set block is L in the just-tracking state, whereas the scanning distance is varied by ±Δ responsive to a tracking error, if there be any. Thus the time detected by the time detection circuit 53 is varied depending on the tracking error as from the time for the just-tracking state.

The tracking servo circuit 54 detects the time difference between the reference time corresponding to the time for the just-tracking state and the time detected by the time detection circuit 53, that is the tracking error, and controls the capstan driving circuit 55 driving the capstan motor of the tape running system of the recording/reproducing section 30, based upon the detection output, so that the tracking error will be reduced to zero.

The data streamer, having the above-described tracking control section 50, is capable of effecting tracking control without having to record tracking-control ATF signals on the magnetic tape. Since there is no necessity in this manner to provide a recording portion for recording tracking-control ATF signals, the data volume of the main data can be correspondingly increased for further enhancing the track utilization efficiency.

With the above-described data streamer, the system logs for the partitions P1 and P2, generated by the system log generating circuit 22C, are recorded by the sub-code appending circuit 24 in the system region of the partition P1 as the subcode. It is however possible to supply the system logs of the partitions P1 and P2, generated by the system log generating circuit 22C, to the C2 encoder 23B, and to record the system logs as main data in the system region of the partition P1.

If the system logs of the partitions P1 and P2 are recorded as main data in the system region of the partition P1, the system log may also be corrected for errors by the error correction code C2, thus raising the system log reliability.

Figure 12:
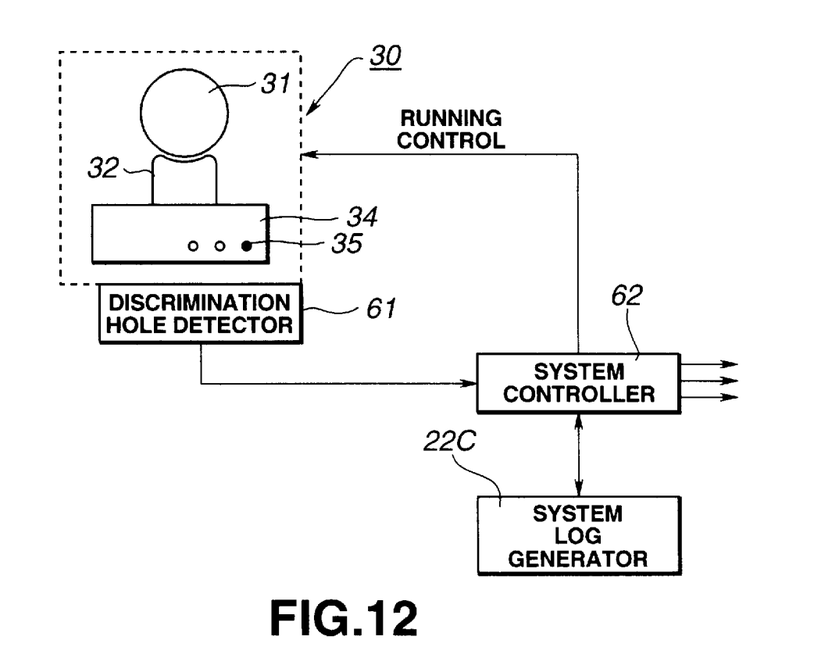
FIG. 12 is a schematic block diagram showing the construction of main portions for format discrimination in case of handling magnetic tapes of plural tape formats in the data streamer.

The present data streamer may also be configured to handle magnetic tapes of plural tape formats. In such case as shown in FIG. 12, tape format discrimination holes 35 are provided in a tape cartridge 34 loaded on the recording/reproducing section 30, so as to be detected by a discrimination hole detector 61, a detection output of which is fed to a system controller 62. The system controller then performs format discrimination of the magnetic tape 32 and effects control depending on respective formats in accordance with the flow chart shown in FIG. 13.

Figure 13:
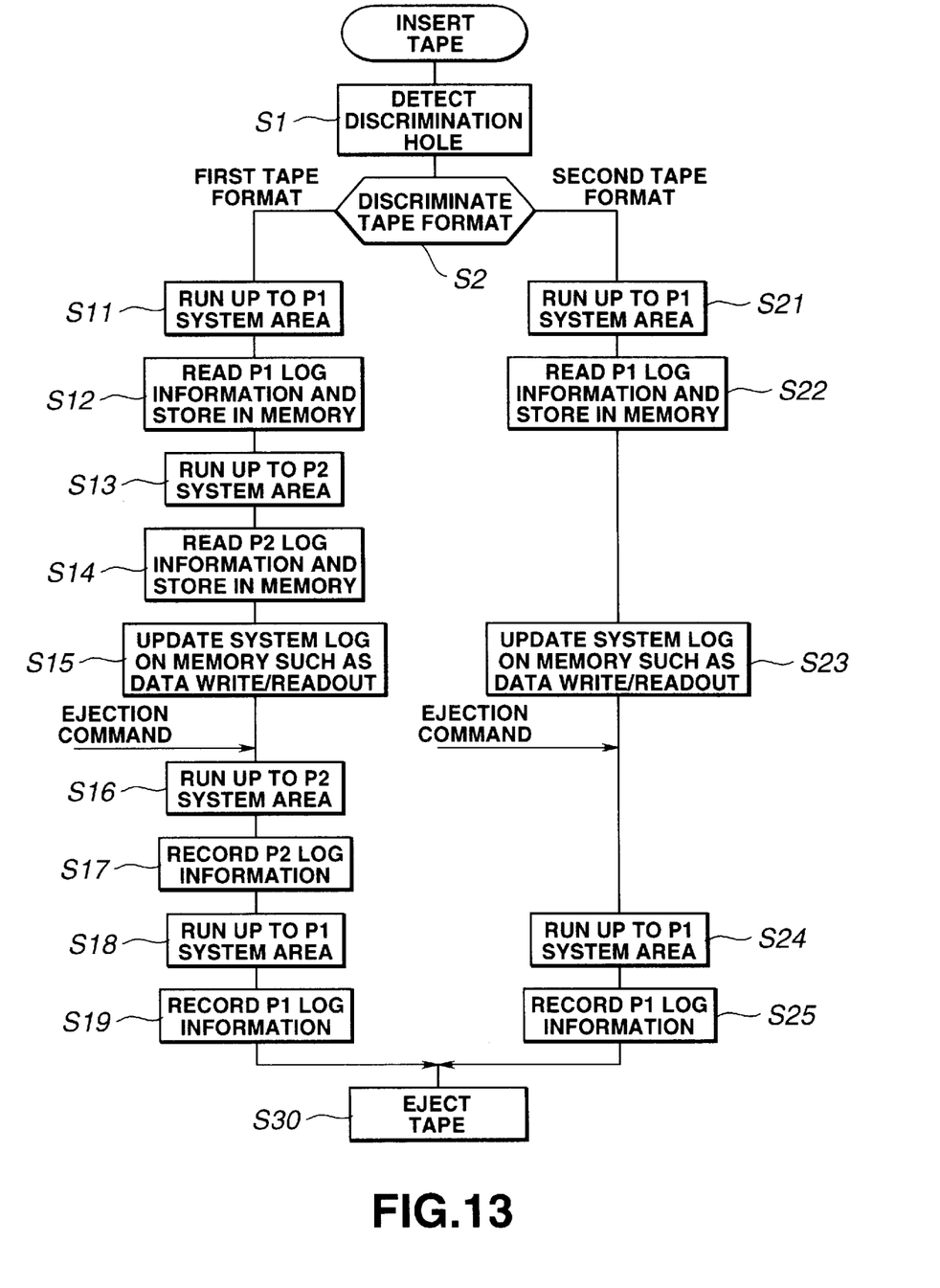
FIG. 13 is a flow chart for illustrating the control operation of the two sorts of tape formats.

When the tape cartridge 34 housing the magnetic tape 32 therein is loaded on the recording/reproducing section 30, the system controller 62 detects, at step S1, the tape format discriminating hole 35 provided in the tape cartridge 34 is detected by the tape format discrimination hole detector 61. At the next step S2, the system controller effects format discrimination of the magnetic tape 32 based upon the detection output.

If the system controller 62 judges the tape format to be a first tape format or a second tape format at step S2, it transfers to step S11 or to step S21, respectively.

The first tape format is the conventional DDS2 format, while the second tape format is the format employed in the above-described embodiment.

At step S11, the system controller 62 causes the magnetic tape 32 to run as far as the system region of the first partition P1. At step S12, the system controller 62 reads out the system log information of the first partition P1 for storage in a memory. At the next step S13, the system controller 62 causes the magnetic tape 32 to run as far as the system region of the second partition P2 and, at the next step S14, reads out the system log information of the second partition P2 for storage in a memory.

At the next step S15, the system controller 62 performs various control operations, such as data write/readout, and updates the system log on the memory depending on the contents of the control operations.

When the system controller 62 accepts an ejection command, it transfers to step S16 and causes the magnetic tape 32 to run as far as the system region of the second partition P2. At step S17, the system controller 62 records the system log information of the second partition P2 in the system region of the second partition P2. At the next step S18, the system controller causes the magnetic tape 32 to run as far as the system region of the first partition P1. At step S19, the system controller 62 records the system log information of the first partition P1 in the system region of the first partition P1. The system controller 62 then transfers to step S30 and ejects the tape cartridge 34 from the recording/reproducing section 30 to complete the control on the magnetic tape 32 of the first tape format.

Thus the system logs of the partitions P1 and P2 are individually recorded in the system regions of the respective partitions of the magnetic tape 32 of the first tape format by a series of operations of the steps S11 to S19.

On the other hand, the system controller 62 causes the tape 32 to run at step S21 as far as the system region of the first partition P1. At step S22, the system controller reads out the system log information of the first partition P1 for storage in a memory.

At step S23, the system controller 62 performs various control operations, such as data write/readout operations, and updates the system logs on the memory depending on the contents of the control operations.

When the system controller 62 accepts an ejection command, it transfers to step S24 and causes the magnetic tape 32 to run as far as the system region of the first partition P1. At step S19, the system controller 62 records the system log information of the first partition P1 and the system log information of the second partition P2 in the system region of the first partition P1. The system controller 62 then transfers to step S30 and ejects the tape cartridge 34 from the recording/reproducing section 30 to complete the control on the magnetic tape 32 of the second tape format.

Thus the system logs of the partitions P1 and P2 are individually recorded in the system region of the first partition of the magnetic tape 32 of the second tape format by a series of operations of the steps S21 to S25.

Although the system logs of the partitions P1 and P2 of the magnetic tape 32 of the second tape format may be recorded as the sub-codes in the system region of the first partition, the system logs may be protected by the error correction code C2 if the system logs are recorded as main data, thereby improving system log reliability.

Figure 14:
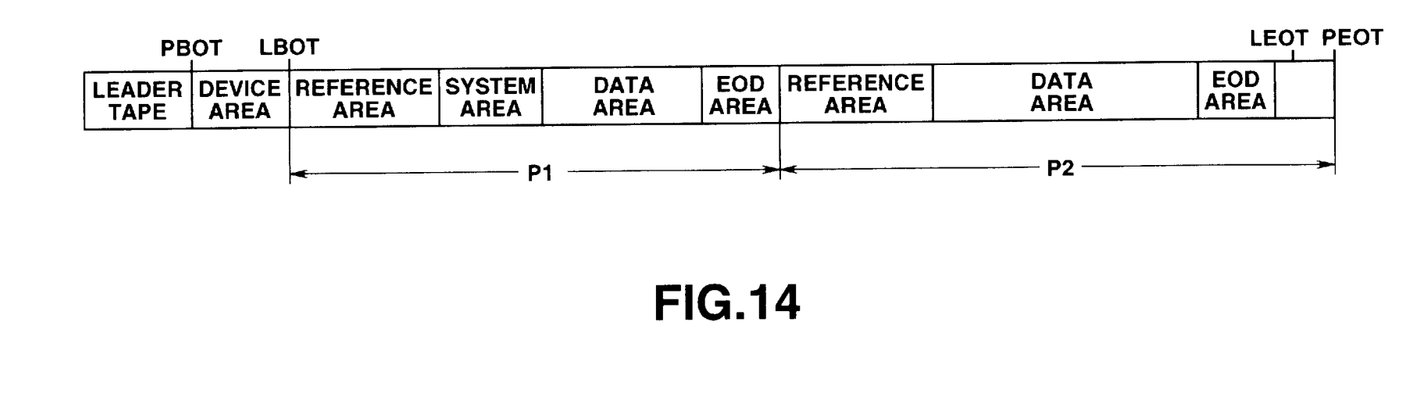
FIG. 14 shows another tape format of the two-partition magnetic tape.

In the above-described embodiments, a tape format comparable to the DDS2 tape format in which the partitions P1 and P2 are each composed of the reference region, system region and the EOD region. However, since the system logs of both the partitions P1 and P2 are recorded in the system region of the leading side partition P1, it is also possible to employ a tape format in which the system region of the trailing side partition P2 is omitted to leave only the system region of the leading side partition P1, as shown in FIG. 14.

What is claimed is:

1. A data recording and retrieval method for a tape-shaped recording medium having a leading end comprising the steps of:

partitioning said tape-shaped recording medium into a plurality of partitions;

designating a system region for at least a leading partition of said plurality of partitions, wherein the leading partition is chosen as the partition most proximate to the leading end of the tape-shaped recording medium;

recording format data to form a plurality of azimuth tracks on the tape-shaped recording medium using a rotary head in said plurality of partitions in regions not designated as a system region; and recording system log information as main data for each partition of said plurality of partitions into said system region of said leading partition of the plurality of partitions, whereby retrieval of data from each of the plurality of partitions is performed based only on the system log information recorded as main data in the leading partition, whereby the system log data will be subject to the same error correction algorithms as the format data.

2. The data recording and retrieval method as claimed in claim 1, comprising the further steps of:

constituting each track of the tape-shaped recording medium by a main data area and margin areas provided on both sides of the main data area;

constituting the main data area of each track by a plurality of blocks; and constituting each of the blocks by an area for recording a synchronization signal, an area for recording subcode data, and an area for recording main data.

3. A data recording and retrieval method for a tape-shaped recording medium comprising the steps of:

partitioning said tape-shaped recording medium into a plurality of partitions;

recording format data to form a plurality of azimuth tracks on the tape-shaped recording medium using a rotary head, the tape-shaped recording medium having a leading end; and recording system log information for each partition of said plurality of partitions, each partition having at least a system region and a data region, into the system region of a leading partition of the plurality of partitions as main data, the leading partition being the partition most proximate to the leading end of the tape-shaped recording medium, whereby retrieval of data from each of the plurality of partitions is performed based only on the system log information recorded as main data in the leading partition, whereby the system log data will be subject to the same error correction algorithms as the format data.

4. The data recording and retrieval method as claimed in claim 3, further comprising the steps of:

constituting each track of the tape-shaped recording medium by a main data area and margin areas provided on both sides of the main data area;

constituting the main data area of each track by a plurality of blocks; and constituting each of the blocks by an area for recording a synchronization signal, an area for recording subcode data, and an area for recording main data.

* * * * *